(12) United States Patent
Hauber et al.

(10) Patent No.: US 9,346,244 B2
(45) Date of Patent: May 24, 2016

(54) COMPOSITE BUILDING BOARDS WITH THERMOPLASTIC COATINGS AND CEMENTITIOUS PRECOATED FIBROUS MATS

(75) Inventors: Robert Joseph Hauber, Tampa, FL (US); Gerald D. Boydston, Cody, WY (US)

(73) Assignee: CertainTeed Gypsum, Inc., Tampa, FL (US)

( * ) Notice: Subject to any disclaimer, the term of this patent is extended or adjusted under 35 U.S.C. 154(b) by 770 days.

(21) Appl. No.: 13/006,691

(22) Filed: Jan. 14, 2011

(65) Prior Publication Data

US 2011/0256372 A1 Oct. 20, 2011

Related U.S. Application Data

(63) Continuation-in-part of application No. 12/480,159, filed on Jun. 8, 2009, now Pat. No. 8,486,516.

(60) Provisional application No. 61/093,167, filed on Aug. 29, 2008.

(51) Int. Cl.
*B32B 13/02* (2006.01)
*B32B 5/02* (2006.01)
(Continued)

(52) U.S. Cl.
CPC . *B32B 13/04* (2013.01); *B32B 3/04* (2013.01); *B32B 5/022* (2013.01); *B32B 5/18* (2013.01); *B32B 7/02* (2013.01); *B32B 13/14* (2013.01); *B32B 27/12* (2013.01); *B32B 27/306* (2013.01); *C04B 28/14* (2013.01); *E04C 2/043* (2013.01); *B32B 2255/02* (2013.01); *B32B 2255/26* (2013.01); *B32B 2255/28* (2013.01); *B32B 2262/101* (2013.01); *B32B 2307/536* (2013.01); *B32B 2307/72* (2013.01); *B32B 2419/00* (2013.01); *C04B 2111/00405* (2013.01); *C04B 2111/00612* (2013.01);
(Continued)

(58) Field of Classification Search
USPC .................................. 428/218; 442/76, 327
See application file for complete search history.

(56) References Cited

U.S. PATENT DOCUMENTS 2,806,811 A 9/1957 Von
3,993,822 A 11/1976 Knauf et al.
(Continued)

FOREIGN PATENT DOCUMENTS

CA 2070489 A * 12/1993
JP 58076564 A 5/1983
(Continued)

OTHER PUBLICATIONS

Machine_English_Translation_KR_2002076428_A; OH, Gs; Refractory Gypsum Boards; Oct. 11, 2002; KIPO; whole document.*

*Primary Examiner* — Tahseen N Khan
(74) *Attorney, Agent, or Firm* — GrayRobinson, P.A.; Michael J. Colitz, III

(57) ABSTRACT

Disclosed is a composite building board construction. The board includes a set gypsum core and a fibrous mat that is pre-coated with a cementitious layer. A thermoplastic coating is then applied over the cementitious layer. Additives can be added to one or more of the layers to provide enhanced performance characteristics. Also discloses are various manufacturing techniques for applying a hot melt thermoplastic coating to cementitious layer.

10 Claims, 4 Drawing Sheets

FIG. 3

(51) Int. Cl.
   *B32B 7/04*      (2006.01)
   *B32B 13/04*     (2006.01)
   *B32B 3/04*      (2006.01)
   *B32B 5/18*      (2006.01)
   *B32B 7/02*      (2006.01)
   *B32B 13/14*     (2006.01)
   *B32B 27/12*     (2006.01)
   *B32B 27/30*     (2006.01)
   *C04B 28/14*     (2006.01)
   *E04C 2/04*      (2006.01)
   *C04B 111/00*    (2006.01)

(52) U.S. Cl.
   CPC ... *Y10T 428/24992* (2015.01); *Y10T 442/2139* (2015.04); *Y10T 442/60* (2015.04)

(56) References Cited

U.S. PATENT DOCUMENTS

| | | |
|---|---|---|
| 4,255,485 A | 3/1981 | Yau |
| 4,265,979 A | 5/1981 | Baehr et al. |
| 4,378,405 A | 3/1983 | Pilgrim |
| 4,563,392 A * | 1/1986 | Harpell et al. ............... 428/394 |
| 5,102,728 A | 4/1992 | Gay et al. |
| 5,112,678 A | 5/1992 | Gay et al. |
| 5,397,631 A | 3/1995 | Green et al. |
| 6,254,817 B1 | 7/2001 | Cooper et al. |
| 6,524,679 B2 | 2/2003 | Hauber et al. |
| 6,673,177 B2 | 1/2004 | Buckwalter et al. |
| 6,746,781 B2 | 6/2004 | Francis et al. |
| 6,866,492 B2 | 3/2005 | Hauber et al. |
| 6,977,111 B2 | 12/2005 | Yamaguchi et al. |
| 7,138,346 B2 | 11/2006 | Bush et al. |
| 7,354,876 B2 | 4/2008 | Porter et al. |
| 7,393,799 B2 | 7/2008 | Porter |
| 2002/0102390 A1 * | 8/2002 | O'Neill et al. ............... 428/192 |
| 2003/0118377 A1 | 6/2003 | Hirano |
| 2004/0142618 A1 | 7/2004 | Porter |
| 2005/0202742 A1 * | 9/2005 | Smith et al. ............... 442/256 |
| 2007/0015424 A1 * | 1/2007 | Toas et al. ............... 442/59 |
| 2007/0077436 A1 | 4/2007 | Naji et al. |
| 2007/0093159 A1 | 4/2007 | Kajander |
| 2007/0141931 A1 | 6/2007 | Nandi et al. |
| 2007/0197114 A1 | 8/2007 | Grove |
| 2008/0057318 A1 | 3/2008 | Adzima et al. |
| 2009/0186549 A1 | 7/2009 | Bennett |
| 2009/0208714 A1 | 8/2009 | Currier et al. |
| 2010/0055431 A1 | 3/2010 | College |
| 2011/0297375 A1 | 12/2011 | Shindgikar et al. |

FOREIGN PATENT DOCUMENTS

| | | |
|---|---|---|
| JP | 2005297254 A | 10/2005 |
| KR | 2002076428 A * | 10/2002 |

* cited by examiner

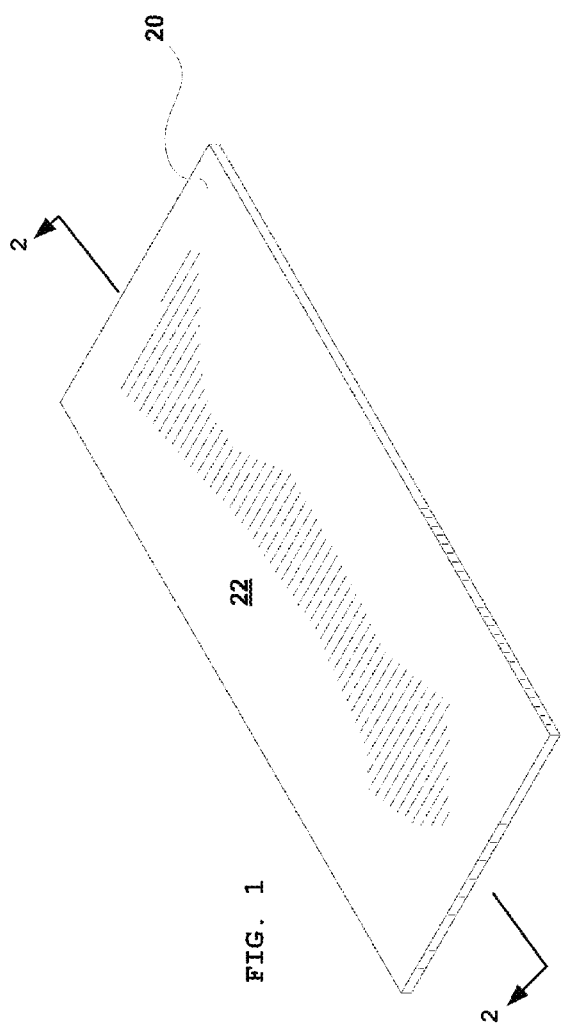
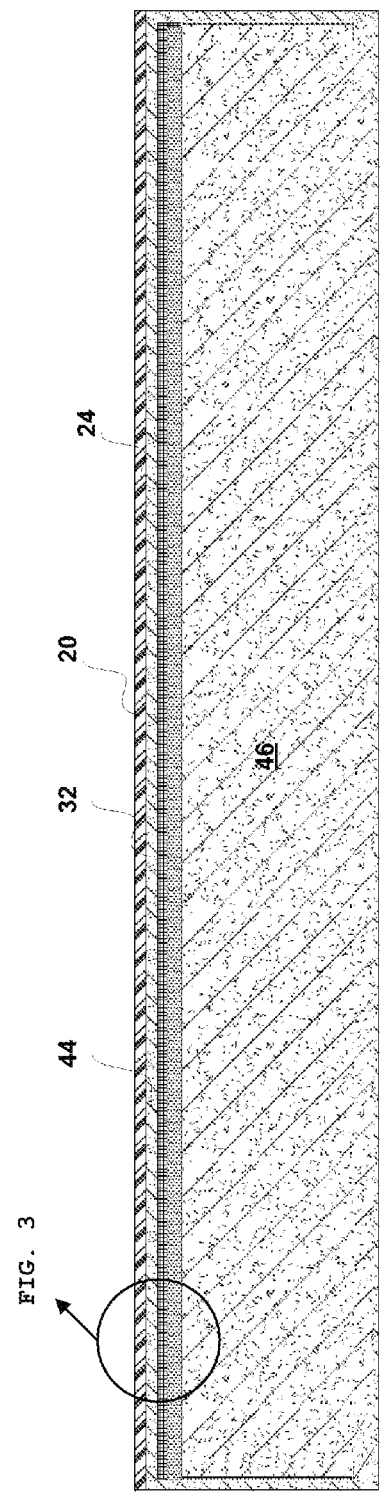

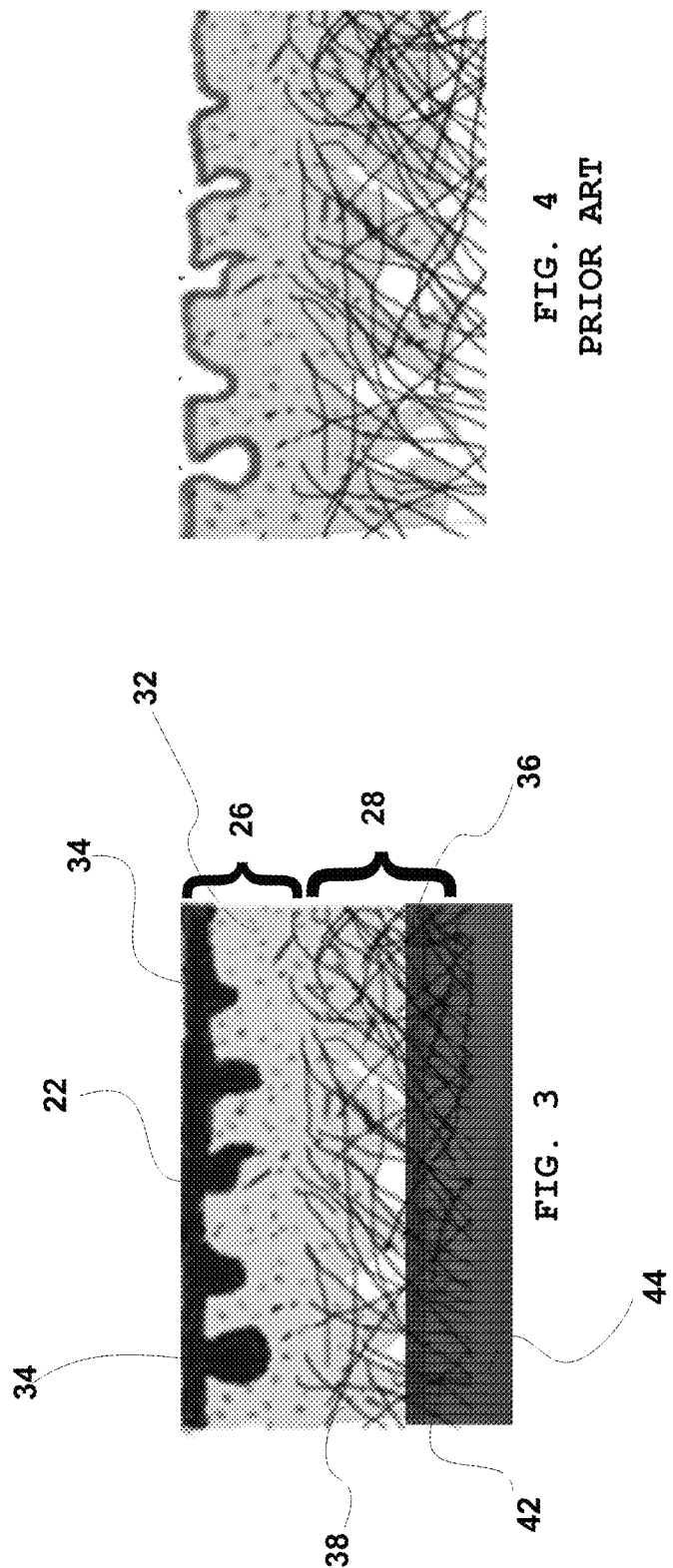

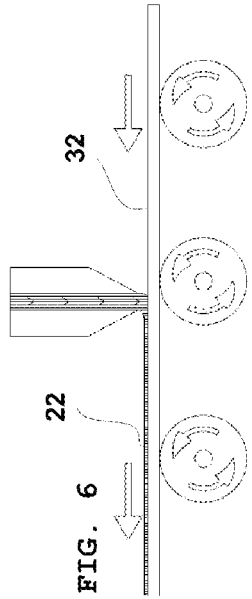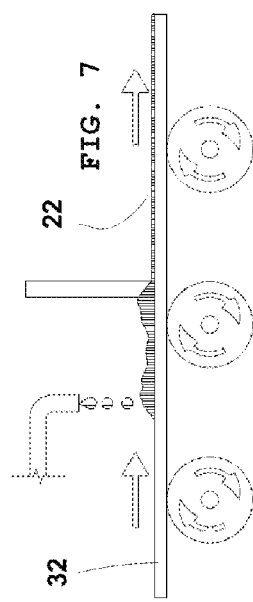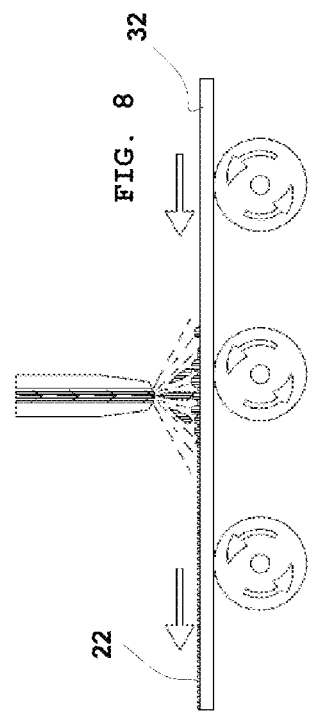

COMPOSITE BUILDING BOARDS WITH THERMOPLASTIC COATINGS AND CEMENTITIOUS PRECOATED FIBROUS MATS

CROSS-REFERENCE TO RELATED APPLICATIONS

This application is a continuation-in-part of, and claims priority to, U.S. patent application Ser. No. 12/480,159, filed on Jun. 8, 2009 and entitled "Plastic Coated Composite Building Boards and Method of Making Same," which in turn claims priority to U.S. Provisional Application No. 61/093,167 filed on Aug. 29, 2008. The contents of both these applications are fully incorporated herein by reference.

BACKGROUND OF THE INVENTION

1. Field of the Invention

This invention relates to an improved construction for composite building boards. More particularly, the present invention relates to a composite building board with an external hot melt thermoplastic coating applied over a cementitious pre-coated fibrous mat.

2. Description of the Background Art

Building board, also known as wallboard, plasterboard, or drywall, is one of the most commonly used building components in the world today. Building board is frequently used within the interior of a dwelling, where it functions both as a finished wall covering and as a structural room partition. Building board can also be used on the exterior of a dwelling, where it serves as a sheathing to provide weather protection and insulation. Building board can also be used as an interior facing for other structures as well, such as stairwells, elevator shafts, and interior ducting.

One particularly popular form of building board is known as gypsum board. Gypsum board is constructed by depositing a layer of cementitious gypsum slurry between two opposing paper liners. Gypsum slurry is the semi-hydrous form of calcium sulfate and has many physical characteristics that make it suitable for use as a building component. For example, gypsum boards generally have a smooth paper surface, a consistent thickness, and allow for the application of finishing enhancements, such as paint. Gypsum board is also desirable because it provides a degree of fire resistance and sound abatement.

An example of a paper-covered gypsum board is disclosed in U.S. Pat. No. 2,806,811 to Von Hazmburg. Von Hazmburg discloses a board that primarily consists of a thick gypsum core that is encased in a fibrous envelope consisting of both a manila sheet and a newsprint sheet. These sheet layers can be made from a conventional multi-cylinder paper making process.

Although conventional paper faced gypsum board, such as that disclosed by Von Hazmburg, is acceptable for many applications, it also has considerable drawbacks. A major drawback is durability. Gypsum board is far more brittle than other building materials, such as wood or masonry based materials. Paper faced gypsum boards, therefore, chip and/or crumble under both compressive and tensile loads. As a result, conventional gypsum board is easily damaged during normal wear and tear within a dwelling, such as impacts with people and/or furniture. Conventional gypsum board assemblies often have low load carrying capacity and inadequate nail pull strength. As a result, traditional gypsum board often cannot support the loads needed to hang pictures or install shelving without the use of supplemental fasteners.

As a consequence of these drawbacks, efforts have been made over the years to improve the durability and surface strength of gypsum board. One particularly useful development is known as glass reinforced gypsum (GRG) board. An example of one such board is disclosed in U.S. Pat. No. 4,265,979 to Baehr et. al. Baehr discloses a paper-free gypsum board construction. More specifically, Baehr replaces paper facing sheets with opposing layers formed, in part, from glass fiber mats. This construction provides a stronger and harder external surface and is an improvement over paper faced boards. Although an improvement from the standpoint of durability, the use of exposed fiber mats is problematic. Namely, workers handling such boards are exposed to lose strands of fiber. This poses a health risk and necessitates the use of protective gloves and/or masks. Thus, GRG boards utilizing exposed facing sheets are not ideal.

A subsequent improvement is described in commonly owned U.S. Pat. No. 4,378,405 to Pilgrim. The contents of the Pilgrim patent are fully incorporated herein by reference. Pilgrim discloses a GRG board that is faced on one or both sides with a porous, nonwoven glass mat. However, the glass mat of Pilgrim is slightly embedded into the slurry core. This is accomplished by vibrating the gypsum slurry to cause it to pass through the porous openings in the mat.

Embedding the mat within the core results in a thin film of slurry being formed on the outer surface of the board. Building boards with this construction are referred to as embedded glass reinforced gypsum (EGRG) boards. EGRG boards eliminate, or greatly reduce, the presence of exposed fibers and otherwise provide a smooth working surface. Despite eliminating the safety issues surrounding GRG boards, Pilgrim ultimately failed to provide a board with sufficient strength and durability.

A further improved EGRG board is disclosed in commonly owned U.S. Pat. No. 6,524,679 to Hauber, et al. The contents of the Hauber patent are fully incorporated herein by reference. The EGRG board of Hauber adds a polymeric compound to the gypsum slurry. Suitable polymeric compounds may include, for example, polyvinyidene chloride (PVDC), or polyvinylchloride (PVC), or similar polymers. The polymer additive increases durability and board strength and also creates a matrix within the slurry after it sets. Although certainly an improvement over existing EGRG technology, Hauber did not address issues associated with the durability of the exterior face or the complete mechanical and chemical bonding of the exterior face to the underlying gypsum slurry.

Thus, there still exists a need in the art for improved building board construction. More specifically, there is a need in the art for a board with a polymer matrix that provides enhanced durability, impact resistance, water repellency, fire resistance, and load carrying capacities. There is also a need in the art for a board that provides these physical properties without unduly increasing the weight or cost of the resulting board. The present invention is aimed at achieving these objectives.

SUMMARY OF THE INVENTION

It is therefore one of the objectives of this invention to utilize a cementitious pre-coated fibrous mat in conjunction with an external hot melt thermoplastic coating.

It is another object of this invention to provide a thermoplastic coating as a partial or complete surface covering for a cementitious pre-coated fibrous mat.

Yet another object of this invention is to provide a thermoplastic coating over a pre-coated fibrous mat wherein the thermoplastic coating includes additives for enhancing performance characteristics.

A further object of this invention is to allow multiple product variations to be achieved without changing the formulation of the hot melt thermoplastic coating.

Still yet another object is to apply a hot melt thermoplastic to a pre-coated fibrous mat to thereby enhance the mechanical and chemical bonding between the thermoplastic and the mat.

It is also an object of this invention to produce a composite building board with enhanced strength and reduced weight.

Another object of the invention is to reduce both the manufacturing and capital costs associated manufacturing building boards.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a perspective view of a composite building board constructed in accordance with the present invention.

FIG. 2 is a cross sectional view of the composite building board taken along Line 2-2 of FIG. 1.

FIG. 3 is a detailed view taken from FIG. 2 and showing the thermoplastic coating applied to the underlying cementitious pre-coated mat.

FIG. 4 is a detailed view of a prior art construction with a thermosetting coating being applied to the cementitious pre-coated mat.

FIG. 6 is a view of a curtain coater used to apply the thermoplastic coating of the present invention.

FIG. 7 is a view of a knife coater used to apply the thermoplastic coating of the present invention.

FIG. 8 is a view of a spray coater used to apply the thermoplastic coating of the present invention.

Similar reference characters refer to similar parts throughout the several views of the drawings.

DETAILED DESCRIPTION OF THE PREFERRED EMBODIMENT

Figure 5:
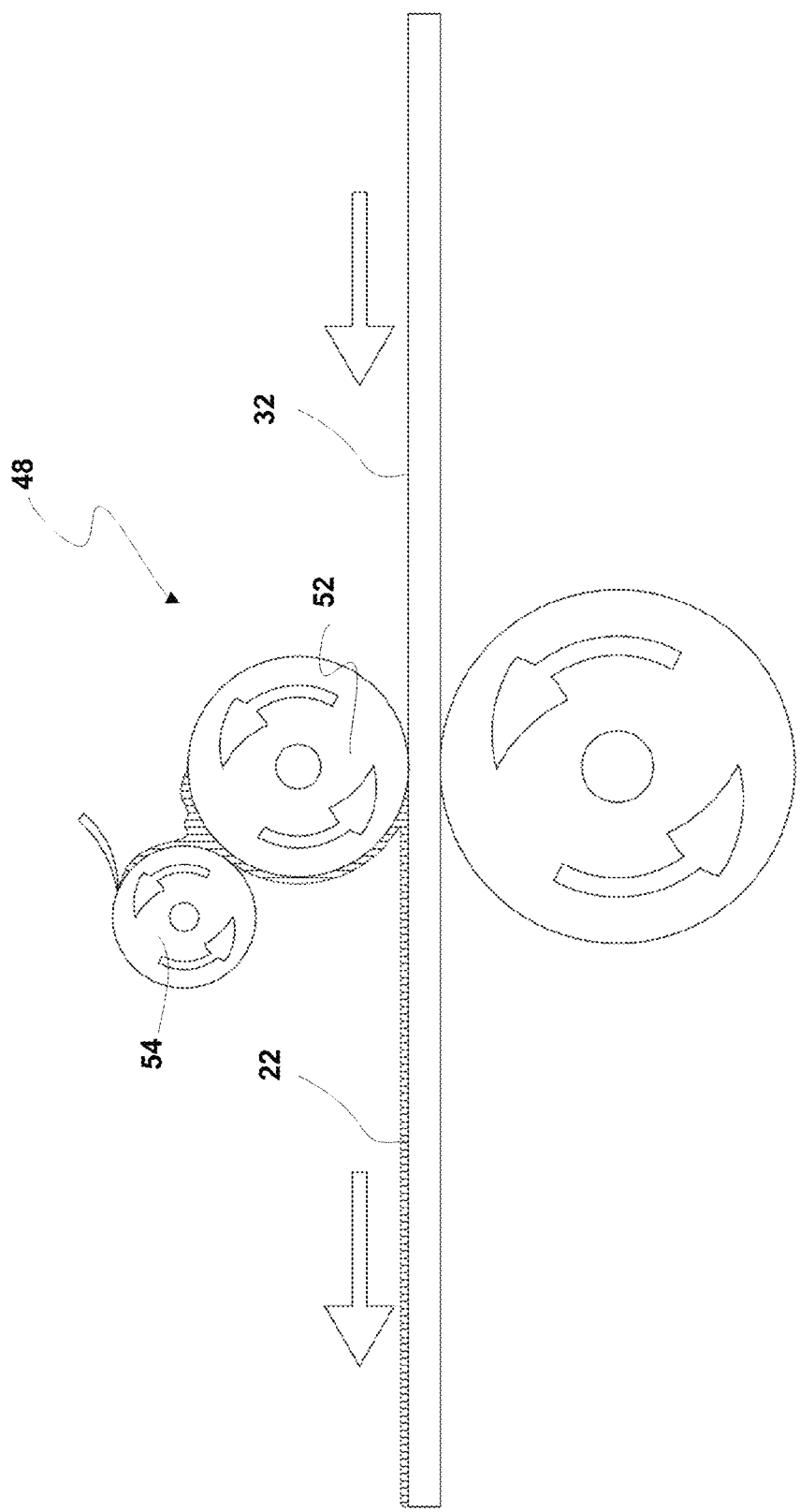
FIG. 5 is a view of a roller coater used to apply the thermoplastic coating of the present invention.

The present invention relates to a composite building board construction. The board includes a set gypsum core and a fibrous mat that is pre-coated with a cementitious layer. A thermoplastic coating is then applied over the cementitious layer. Additives can be added to one or more of the layers to provide enhanced performance characteristics. Also disclosed are various manufacturing techniques for applying a hot melt thermoplastic coating to cementitious layer.

FIG. 1 is a perspective view of a composite building board 20 constructed in accordance with the present invention. Building board 20 is typically formed in long sheets in a continuous production line process. The sheets are thereafter cut to a desired length. However, the present invention is by no means limited to any specific board dimensions or geometry. As noted in more detail hereinafter, board 20 includes an outer surface that is formed from a thermoplastic 22 that is applied over cementitious pre-coated fiber mat 24 and a set gypsum core. However, a pre-coated fiber mat 24 and thermoplastic coating 22 can also be applied to opposing sides of the set gypsum core. Suitable two-sided manufacturing methods are disclosed in commonly owned U.S. patent application Ser. No. 12/480,159, entitled "Plastic Coated Composite Building Boards and Method of Making Same", the contents of which are fully incorporated herein for all purposes. The thermoplastic layer 22 and pre-coated fiber mat 24 can also be optionally applied to the side edges of board 20.

As noted by the cross-sectional view of FIG. 2, the composite board 20 includes an intermediate layer consisting of a cementitious pre-coated fibrous mat 24. In the context of this invention "pre-coated" references the cementitious material being deposited on the underlying fibers 36 prior to the mat 24 being incorporated into a building board 20. It is envisioned that the mat 24 would be supplied to the manufacturing facility with the cementitious coating 32 being previously applied as a facer. Alternatively, the cementitious coating 32 could be applied at a different phase of the manufacturing process but prior to assembly of the building board 20.

The preferred construction of the mat 24 is next described in connection with FIG. 2. The mat 24 is preferably defined by first and second portions (26 and 28), with the first portion 26 comprising the cementitious layer 32 and the second portion 28 comprising fibers 36 that are at least partially embedded into the cementitious layer 32. The cementitious layer 32 can be formed from set gypsum, gray or white portland cement, calcium carbonate, or any combination of the forgoing. Cementitious layer 32 can be latex based and may, or may not, include polymer additives. The upper surface of the cementitious layer 32 includes a plurality of pores 34 of varying size and depth. Pores 34 generally range in depth between 0.05 to 1 mm and are largely the by-product of foaming agents present within the cementitious layer. The pore size can also be varied by altering the ratio of organic and inorganic fillers within the cementitious layer. These pores 34 are the result of the cementitious coating 32 have a rough and textured surface. As note below, these pores 34 function as bonding sites during the application of the thermoplastic.

The fibers 36 of the second portion 28 are preferably non-woven, randomly aligned glass fibers 36. The fibers 36 can be held together in a binder. Suitable binders include resins, such as urea-formaldehyde. The fibers 36 can also be long inorganic fibers, such as glass fibers, and can also be continuous, non-continuous, or blends of both. The fibers 36 can alternatively be formed from organic filaments. In a further embodiment, mineral fibers are used. Small diameter fibers are preferred; namely, fibers with an average diameter of between approximately 13-16 μm. The resulting fibrous mat 24 is sufficiently porous to allow for the passage of gypsum slurry between the individual fibers 36, whereby open fibers 36 can be coated, or substantially coated, with gypsum slurry.

The glass fibers 36 of the mat 24 are further defined by upper and lower extents (38 and 42). As noted in the detailed view of FIG. 3, the upper extents 38 of the fibers 36 are embedded within the cementitious pre-coating 32, thereby binding the two portions of the mat 24. A binder can be added to the lower extents 42 of the fibers 36. Even with a binder, prior to mat 24 being applied to a gypsum core, the lower extents 42 of fibers 36 are loose and capable of being embedded in slurry. The lower extents 42 of the fibers 36 define a fibermat that is essentially encased in slurry during subsequent manufacturing steps.

Suitable cementitious pre-coated fibrous mats include any of the Coated Glass Facer (CGF) products currently sold and manufactured by Atlas Roofing Corporate of Meridian, Mississippi. Atlas' CGF products include a substrate that is formed from a glass fiber wet process mat and that is coated with a latex based, inorganic filled, coating. The glass mat serves as reinforcement for the coating and any added substrates. Atlas' CGF products are more fully described in the following U.S. Patents, all of which are incorporated herein by reference: U.S. Pat. Nos. 5,102,728, 5,112,678, and 7,138,346. Other suitable CGF products are manufactured by Johns Manville of Denver, Colo., Owens Corning, Inc. of Summit, Ill., and Elk Corporation Dallas, Tex. Alternatives to commercially available pre-coated mats can also be used to reduce costs.

As noted in FIG. 2, the cementitious pre-coated fibrous mat 24 is subsequently adhered to a core of gypsum slurry. A dense layer 44 of gypsum slurry is formed intermediate the pre-coated mat 24 and core 46. Both the dense slurry layer 44 and the core slurry layer 46 are subsequently cured in an oven in a manner known in the art. In the preferred embodiment, the dense slurry layer 44 penetrates the lower extents 42 of the glass fibers 36 by approximately 90% to 100%. In other words, 90% to 100% of the length of the exposed glass fibers 36 (i.e. the portion of the fibers 36 not embedded into the cementitious layer 32) are covered by the dense gypsum layer 44. This permits the lower extents 42 of the glass fibers 36 to be substantially encased. Furthermore, the cementitious layer 32 acts as a boundary and largely prevents the dense layer 44 from penetrating the outer surface of the board 20. However, some slurry from core 46 can penetrate the outer surface of board 20.

The dense slurry layer 44 preferably includes a polymer additive to increase the overall durability and surface strength of the board 20. The polymer additive also preferably facilitates a strong chemical bond between itself and core. These polymer additives will react and chemically bond with polymers in adjacent layers. Suitable polymeric additives may include, for example, polyvinyidene chloride (PVDC), or polyvinylchloride (PVC), or similar polymers. Another suitable polymer additive is a functionalized styrene butadiene (SBD) latex that is available from Omnova Solutions of Fairlawn, Ohio. Yet another suitable additive is silane or a functionalized silane ($SiH_4$). Silane compounds are ideally used in conjunction with other polymers to facilitate coupling between the polymer to glass fibers 36. Silane is also known as a stabilizing agent. Suitable silane compounds are sold by Dow Corning. Still yet other polymer additives are described in U.S. Pat. No. 6,524,679 to Hauber. Whatever additive is utilized, it should be capable of providing covalent, allyl, Vanderwal, single and double bonding to the adjacent coatings. The polymer additives referenced above can be included in the thermoplastic layer 22, the cementitious pre-coating 24, as well as the dense and core set gypsum layers (44 and 46)

With continuing reference to FIG. 2, the core layer 46 of set gypsum is bonded to the dense layer 44. The core 46 layer has a density that is less than the density of the dense layer 44. The core slurry layer 46 generally comprises the majority of board thickness and extends to, and bonds with, the adjacent dense slurry layer 44. The core slurry 46 can likewise include a polymer additive for the purpose of adding durability and surface strength. The polymer additive within core slurry 46 preferably chemically bonds with, and cross-links to, the polymer additives within the dense slurry layers 44. Any of the above referenced polymers are suitable for this purpose.

The hot melt thermoplastic coating 22 is applied over the cementitious layer 32 and forms the exterior surface of the building board 20. In the preferred embodiment, a hot melt thermoplastic coating 22 with a melting point of between approximately 100° F. to 500° F. is utilized. The thermoplastic is preferably applied in a molten state so that it can penetrate the pores 34 within the upper surface of the pre-coating 32. The result is both a chemical and mechanical bond between the coating and the mat 24. Namely, the thermoplastic coating 22 cross-links with the polymer additive in the pre-coating 32. Additionally, the molten thermoplastic entirely, or mostly, fills the pores 34 within the cementitious layer 32. Once the thermoplastic sets and/or returns to a solid state, the filled pores 34 act as a root structure that mechanically adheres the plastic coating to the underlying cementitious pre-coated glass mat 24.

The preferred thermoplastic is Ethylene Vinyl Acetate (EVA) applied at a thickness of between 0.1 grams to 35 grams per square foot. Metallocene catalyzed polymers are also preferred. However, any of the following thermoplastic coatings materials, used singularly or in combined, may optionally be used for the exterior coating 22: Acrylonitrile butadiene styrene (ABS), Celluloid, Cellulose Acetate, Ethylene-Butyl Acrylate, Ethylene-Methyl Acrylate, Ethylene Vinyl Alcohol (EVAL), Fluoroplastics (PTFEs, including FEP, PFA, CTFE, ECTFE, ETFE), Ionomers, Liquid Crystal Polymer (LCP), Metallocene, Polyacetal (POM or Acetal), Polyacrylates (Melt and Cure Acrylics), Polyacrylonitrile (PAN or Acrylonitrile), Polyamide (PA or Nylon), Polyamide-imide (PAI), Polyaryletherketone (PAEK or Ketone), Polybutyadiene (PBD), Polybutylene (PB), Polybutylene Terephthalate (PBT), Polybutylene Terephthalate (PET), Polycyclohexylene Dimethylene Terephthalate (PCT), Polycarbonate (PC), Polyketone (PK), Polyester, Polyethylene/Polythene/Polyethane, Polyether Block Amide (PEBA), Polyetheretherketone (PEEK), Polyetherimide (PEI), Polyethersulfone (PES), Polyethylenechlorinates (PEC), Polyimide (PI), Polylactic Acid (PLA), Polymethylpentene (PMP), Polyphenylene Oxide (PPO), Polyphenylene Sulfide (PPS), Polyphthalamide (PPA), Polypropylene (PP), Polystyrene (PS), Polysulfone (PSU), Polyvinyl Chloride (PVC), Spectralon, thermoplastic Olefinic Elastomer (TPO). These above compounds may be blended with tackifying resins and/or waxes as required for application of hot melts and/or desired physical properties.

Any of the above referenced hot melt thermoplastics yields sufficient adhesion between the plastic coating and the underlying board. By contrast, and as noted in FIG. 4, the use of thermal setting coatings have proven problematic. Namely, the application of thermal setting coating to the surface of cementitious pre-coated fibrous mat 24 is subject to limited adhesion characteristics as a result of limited penetration, binding, and area displacement characteristics. When one applies a thermal set coating to a cementitious pre-coated fibrous mat 24, said coating is limited in its binding characteristic due to a number unfavorable circumstances relating to the application surface of the cementitious pre-coating 32 embedded into the fibrous mat 24. With thermal set coatings, only a film is left to occupy the invaded area once the coating cures. This offers a relatively low adhesion quality in the porous areas. A simple tape test can demonstrate the weakness of this adhesion quality, wherein the tape once applied to the outer cured thermal set coating can be easily pulled free liberating the coating away from the previously covered area.

In contrast, adhesion of the thermoplastic coating 22 to the cementitious pre-coating 32 is significantly stronger and more uniformly complete in its coverage. The thermoplastic fully invades the small surface pores 34 of the cementitious coating, whereby the pores 34 are completely, or mostly, filled with the thermoplastic. This improved invasive characteristic is accomplished as a result of the thermoplastic being applied in a hot or molten liquid form. In its hot or molten liquid form, at the point where it is applied to the cementitious pre-coated surface, the thermoplastic flows into pores 34 of the cementitious surface, fully invading previously vacant or open areas. The thermoplastic coating 22 cools immediately locking itself in a rooted manner into the cementitious surface. A tape test on product coated with the hot melt thermoplastic demonstrates that the tape—when removed forcibly—peels clean from the thermoplastic—leaving the external thermoplastic coating 22 on top of the cementitious pre-coated fibrous mat 24, intact.

The thermoplastic coating 22 also serves as a novel mechanism for delivery of a multitude of products built on one platform using one coating type. The thermoplastic coating 22 can be altered to adapt to the specific end user requirement. For instance, each coating within a laminate could have a different chemical composition and/or physical property. Each layer could be formulated to have, or not have, UV resistance and still be durable and capable of offering an extended chemical cross linking mechanism for surface finishing paints or adhesives, thereby making the single coating useful as an interior product or a exterior product if the anti-UV additive were included. Moreover, the thermoplastic coating 22 can be modified to achieved intended results without necessarily altering the basic chemical make up of the board 20.

The thermoplastic coating 22 can include any of a variety of additives, such as fillers or polymeric compounds, to modify the characteristics of the board 20 as needed. These additives include: polar and non-polar polyolefenic compounds, isotactic and atactic polymeric compounds, crystalline and amorphous polyolefenic compounds, natural and synthetic tacifying resins as part of a polyolefenic compound, directly applied low viscosity polyolefenic compounds, the use of films bonded via Vanderwal forces and/or valent or ionic bonding, films with low thermal conductivity, microscopically non-continuous films for engineered molecular water permeability, utilization of dissimilar molecular polymeric active sites for improved molecular adhesion between dissimilar copolymers, non-oriented polymer films, planar oriented polymer films, films with random polymer orientations for film elongation, topographically mirrored polymeric films for improved mechanical adhesion, and the use of multilayered laminations. Any of these additives would form a part of the external most stratum of the resulting building board 20 and would impart certain beneficial physical properties.

FIG. 5 illustrates a roller coater 48 for use in applying the thermoplastic coating 22 directly to the cementitious pre-coated glass mat 24. The roller coater 48 includes both an application roller 52 and a metering roller. 54 The gap between the application and metering rollers can be adjusted and selected to achieved a desired application rate, which is dependent, in part, on the rheology and temperature of the applied coating. Both rollers (52 and 54) can be heated and optionally have a roller hardness that creates the desired thickness on the glass mat 24. The front and back faces of the board 20 can be coated singularly or simultaneously as is known in the art. The thermoplastic coating 22 may also be applied to one, two, three, four, five or six, any one, any combination of, the board 20 surfaces.

Care must be taken to ensure that the gypsum within the core 46 does not calcine during the thermoplastic application. Although the thermoplastic coating 22 is generally heated to the temperature of the application coater (anywhere between 100° to 500°), the fibrous mat 24 is never subject to prolonged exposure insomuch as the rollers are in constant motion. As a result, there is no calcination of gypsum core.

The preferred surface hardness attained as a result of the thermoplastic coating may result in a range of hardness's equal to a minimum of about 50 to a maximum of about 150 on a Rockwell R Hardness scale, or a minimum of about 15 to maximum of about 70 on a Shore A and D Hardness scale. The preferred water vapor permeability of the applied thermoplastic coating may range from a minimum of 0.01 to a maximum of 98, thus the coating may be virtually impervious to the transmission of water vapor movement or completely open to the transmission of water vapor movement. Thermoplastic film translucence may range from 0.001% to 100%. The chosen characteristics will depend upon the intended use of the final board 20. Potential uses include, but are not limited to, interior or exterior sheathing, tile backer, shaft liner, ceiling tile, and or underlayment.

The thermoplastic coating may also contain filler compounds which are intended for uses which may include but are not limited to color (opaque or translucent), UV resistance, tachifying property enhancement, thermal insulation, thermal conductivity, electrically conductivity, electrically non-conductivity, water resistance, water vapor transmission enhancement, water vapor transmission inhibition, light absorption, light refraction, sound propagation, sound inhibition, elastomeric enhancement, rigidity enhancement, impact resistance, puncture resistance, abrasion resistance, volumizing, densifying, fire resistance, and sound reverberation. The thermoplastic coating upon application may be engineered to offer desired surface topography that may range from smooth profile (having measured trace lengths equal to or about a minimum of 0.01) to a coarse profile equivalent to desired specification. Applied film thicknesses of the above mentioned thermoplastics may range from a minimum of 0.01 mils to and maximum of 500 mils in thickness. Applied film thickness may be applied in one or multiple applications at varying or equivalent application temperatures and varying or equivalent application speeds.

Application of the thermoplastic coating may be conducted immediately following the initial set of the gypsum substraight or thereafter. The thermoplastic coating can be applied in any of a variety of known ways, including: gravity fed, pump fed, forward or reverse rotating hot melt roll coaters; gravity fed or pump fed hot melt curtain coaters (note FIG. 6); slot die coaters; knife coating systems (note FIG. 7); gravity fed or pump fed hot melt spray systems (note FIG. 8); high pressure low volume or low pressure high volume methods. The thermoplastic coating may be applied in equal or uniform level or levels, or in unequal or non-uniform level or levels. The thermoplastic coating may be applied by means of continuous or non-continuous process method, although continuous processes are preferred.

The preferred continuous process method involves the removal of the normal end process used to manufacture gypsum building panels. The end process is replaced with a novel inline hot melt coating process specifically designed to overcome the adverse environmental conditions experienced with the manufacture of glass fiber incorporated products. The preferred continuous process may incorporate a minimum of 1 hot melt thermoplastic applicator or as many as 50 hot melt thermoplastic applicators aligned or not aligned in series, parallel, or both to allow a single or multiple thermoplastic coating lines of base platform (blank) product to be produced singularly, in pairs simultaneously, or groups of pairs simultaneously. An alternative advantage of this continuous process is that during normal production multiple products having varying and or different physical properties and other performance characteristics can be produced simultaneously. A further advantage is that the costs associated with the manufacture of low margin products is now capable of being offset, lowering the cost to produce these low margin products as the invention herein disclosed is capable of simultaneously producing high margin products, both of which can be manufactured at equal to or optimized individual speeds as the thermoplastic coating can be formulated or applied in varying levels at any one or any multiple of applicator stations as desired or based on end user need. The end product yielded from this novel continuous process is substantially dust free, a novel and manufacturer/end-user health improvement over all other gypsum build panel products currently being produced.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

The invention claimed is:

1. A composite building board comprising:
   a mat including a first portion having a thickness, the first portion comprised of a latex based cementitious pre-coating and a polymeric additive and a foaming agent, the mat further including a second portion comprised of a series of non-woven, randomly aligned glass fibers, the glass fibers having upper and lower extents, with the upper extents embedded within the pre-coating, a plurality of pores formed within an upper surface of the pre-coating, the pores created by the foaming agent and having a depth ranging from approximately 0.05 mm to 1.0 mm, the depth of the pores being less than the thickness of the first portion;
   a dense layer of set gypsum penetrating the lower extents of the glass fibers by approximately 90% to 100%, whereby the lower extents of the glass fibers are substantially encased by the dense layer, the dense layer including a polymeric additive;
   a core layer of set gypsum that is bonded to the dense layer, the core layer having a density that is less than the density of the dense layer, the core layer including a polymeric additive that is bonded to the polymeric additive in the dense slurry layer;
   a coating, the majority of which comprises a hot melt thermoplastic with a melting point of between 100° F. to 500° F. adhered to the upper surface of the pre-coating, the coating applied in a molten state such that it substantially fills the pores within the upper surface of the pre-coating to form a mechanical bond between the coating and the mat, the coating bonding to the polymer additive in the pre-coating.

2. The composite board as described in claim 1 wherein the board has a hardness of between 50 to 150 on a Rockwell R Hardness scale.

3. A composite building board comprising:
   a mat including a first portion comprised of a cementitious pre-coating the first portion having a thickness, the mat further including a second portion comprised of a series of fibers, the fibers having upper extents embedded within the pre-coating and lower extents, a plurality of pores formed within an upper surface of the pre-coating, the pores ranging in depth, the pores having a depth of no greater than approximately 1 millimeter, the depth of the pores being less than the thickness of the first portion;
   a coating the majority of which is a hot melt thermoplastic, the coating adhered to the upper surface of the pre-coating while in a molten state, the coating substantially filling the pores within the upper surface of the pre-coating to form a mechanical bond between the coating and the mat.

4. The composite building board as described in claim 3 wherein the thermoplastic is a hot melt thermoplastic that is applied in a molten state.

5. The composite building board as described in claim 3 wherein the thermoplastic is Ethylene Vinyl Acetate (EVA).

6. The composite building board as described in claim 3 wherein the thermoplastic is applied at a density of between 0.1 grams to 35 grams per square foot.

7. The composite building board as described in claim 3 wherein the thermoplastic is applied by a heated roller coater.

8. The composite building board as described in claim 3 wherein the fibers are glass fibers.

9. The composite building board as described in claim 3 wherein the lower extents of the glass fibers are essentially encased within a set gypsum layer.

10. The composite building board as described in claim 9 wherein polymeric additives are included in the set gypsum layer and the cementitious pre-coating.

* * * * *